DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 24, 1970

872 O.G. 1051

T872,007

UNBALANCED PROCESS FOR PRODUCING BALANCED POLYETHYLENE TEREPHTHALATE FILM

James J. Jefferson and Marshall T. Watson, both of P.O. Box 511, Kingsport, Tenn. 37662

Continuation of application Ser. No. 810,364, Mar. 25, 1969, which is a continuation-in-part of application Ser. 569,822, Aug. 3, 1966. This application Oct. 3, 1969, Ser. No. 864,956

Int. Cl. B29c *25/00;* B29d *7/24*

U.S. Cl. 264—235

No Drawing. 14 Pages Specification

A process for producing a biaxially oriented polyethylene terephthalate film which has substantially uniformly balanced properties in mutually perpendicular directions including the steps of stretching a substantially amorphous unoriented melt extruded cast film in the direction of extrusion at a stretch ratio of from about 3.5 to about 3.6 times the cast dimension and stretching the film in the transverse direction at a stretch ratio in the range of about 3.0 to 3.2 times the transverse dimension. The quotient of the longitudinal stretch ratio divided by the transverse stretch ratio is greater than 1.10. The rate of stretching, expressed as percentage change per minute of the unstretched dimension, must also be above certain values to produce the balanced properties.